(12) United States Patent
Ahn et al.

(10) Patent No.: US 9,876,213 B2
(45) Date of Patent: Jan. 23, 2018

(54) ELECTRODE ASSEMBLY AND SECONDARY BATTERY HAVING THE ELECTRODE ASSEMBLY

(71) Applicant: SAMSUNG SDI CO., LTD., Yongin-si, Gyeonggi-do (KR)

(72) Inventors: Yiseop Ahn, Yongin-si (KR); Kwangchun Kim, Yongin-si (KR); Junho Lee, Yongin-si (KR); Dongsik Yoon, Yongin-si (KR); Jongpil Jegal, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 87 days.

(21) Appl. No.: 14/988,905

(22) Filed: Jan. 6, 2016

(65) Prior Publication Data

US 2016/0268581 A1  Sep. 15, 2016

(30) Foreign Application Priority Data

Mar. 13, 2015 (KR) .......................... 10-2015-0035173

(51) Int. Cl.
*H01M 10/0587* (2010.01)
*H01M 2/26* (2006.01)
(Continued)

(52) U.S. Cl.
CPC ............. *H01M 2/263* (2013.01); *H01M 2/08* (2013.01); *H01M 2/26* (2013.01); *H01M 4/00* (2013.01);
(Continued)

(58) Field of Classification Search
CPC ...................... H01M 10/0587; H01M 10/0585
See application file for complete search history.

(56) References Cited

U.S. PATENT DOCUMENTS

| | | | |
|---|---|---|---|
| 2005/0130035 A1* | 6/2005 | Inada | H01M 2/266 429/161 |
| 2006/0003221 A1 | 1/2006 | Yeo | |
| 2012/0196165 A1 | 8/2012 | Kim | |

FOREIGN PATENT DOCUMENTS

| | | |
|---|---|---|
| JP | H 09213374 A | 8/1997 |
| JP | 2000-048852 A | 2/2000 |

(Continued)

OTHER PUBLICATIONS

European Extended Search Report dated Jul. 13, 2016.

*Primary Examiner* — Olatunji Godo
(74) *Attorney, Agent, or Firm* — Lee & Morse, P.C.

(57) ABSTRACT

An electrode assembly includes a first electrode plate including a first electrode current collector and a first electrode active material layer thereon, a second electrode plate including a second electrode current collector and a second electrode active material layer thereon, a separator between the first electrode plate and the second electrode plate, a first electrode tab coupled to the first electrode current collector, and a second electrode tab coupled to the second electrode current collector, wherein a region of the first electrode current collector including the first electrode tab faces a wound first electrode plate, wherein a region of the second electrode current collector including the second electrode tab faces a wound second electrode plate, and wherein the second electrode active material layer is only on one surface of the second electrode current collector in a region preceding a first winding turn of the second electrode plate.

20 Claims, 11 Drawing Sheets

(51) Int. Cl.
*H01M 2/08* (2006.01)
*H01M 4/00* (2006.01)
*H01M 6/10* (2006.01)
*H01M 10/04* (2006.01)

(52) U.S. Cl.
CPC ......... *H01M 6/10* (2013.01); *H01M 10/0431* (2013.01); *H01M 10/0587* (2013.01)

(56) References Cited

FOREIGN PATENT DOCUMENTS

| | | |
|---|---|---|
| JP | 2003-086233 A | 3/2003 |
| KR | 2004-0058918 A | 7/2004 |
| KR | 2005-0121509 A | 12/2005 |
| KR | 10-0571268 B1 | 4/2006 |
| KR | 2013-0085202 A | 7/2013 |

* cited by examiner

ELECTRODE ASSEMBLY AND SECONDARY BATTERY HAVING THE ELECTRODE ASSEMBLY

CROSS-REFERENCE TO RELATED APPLICATION

Korean Patent Application No. 10-2015-0035173, filed on Mar. 13, 2015, in the Korean Intellectual Property Office, and entitled: "Electrode Assembly and Secondary Battery Having the Electrode Assembly," is incorporated by reference herein in its entirety.

BACKGROUND

1. Field

The present disclosure relates to an electrode assembly and a secondary battery having the electrode assembly.

2. Description of the Related Art

Unlike primary batteries which cannot be recharged, secondary batteries can be repeatedly charged and discharged. Low capacity batteries that use single battery cells may be used as power sources for various small portable electronic devices, e.g., cellular phones and camcorders. High power batteries that use tens of battery cells connected to each other in a battery pack may be used as power sources for, e.g., hybrid electric vehicles (HEV) or the like.

Secondary batteries may be manufactured in various shapes, including a cylinder shape, a prismatic shape, and a pouch shape. The secondary battery may be fabricated by forming an electrode assembly having a separator as an insulator disposed between a positive electrode plate and a negative electrode plate, and accommodating the fabricated electrode assembly and an electrolyte in a case. A positive electrode terminal and a negative electrode terminal are connected to the electrode assembly and are exposed and protruded to the outside of the case.

SUMMARY

According to an aspect of the present disclosure, there is provided an electrode assembly for a secondary battery, the electrode assembly including a first electrode plate including a first electrode current collector and a first electrode active material layer on at least a region of the first electrode current collector, a second electrode plate including a second electrode current collector and a second electrode active material layer on at least a region of the second electrode current collector, a separator between the first electrode plate and the second electrode plate, a first electrode tab coupled to the first electrode current collector in a mandrel portion of the electrode assembly, and a second electrode tab coupled to the second electrode current collector in a mandrel portion of the electrode assembly, wherein a region of the first electrode current collector including the first electrode tab faces a wound first electrode plate, wherein a region of the second electrode current collector including the second electrode tab faces a wound second electrode plate, and wherein the second electrode active material layer is only on one surface of the second electrode current collector in a region preceding a first winding turn of the second electrode plate.

The second electrode active material layer may be formed on a surface of the second electrode current collector, which faces an outer side of the electrode assembly.

After the first winding turn of the first electrode plate, the first electrode active material layer may be formed on both surfaces of the first electrode current collector.

After the second winding turn of the second electrode plate, the second electrode active material layer may be formed on both surfaces of the second electrode current collector from a region corresponding to the first electrode active material layer.

The second electrode active material layer may be formed on both surfaces of the second electrode current collector between the first winding turn and the second winding turn of the second electrode plate.

Before the first winding turn of the first electrode plate, the first electrode active material layer may be formed on one surface of the first electrode current collector, and the first electrode active material layer may be formed on a surface of the first electrode current collector, facing the outside of the electrode assembly.

The second electrode active material layer may be formed on both surfaces of the second electrode current collector between the first winding turn and the second winding turn of the second electrode plate from a region corresponding to the first electrode active material layer.

The first electrode active material layer may be formed on both surfaces of the first electrode current collector from a region corresponding to an extension line of the end of the first electrode plate positioned at the mandrel portion between the first winding turn and the second winding turn of the first electrode plate.

The first electrode active material layer and the second electrode active material layer may be formed to face each other in a region between an extension line of the end of the first electrode plate and an extension line of the end of the second electrode plate in the mandrel portion.

The first electrode active material layer and the second electrode active material layer may be formed on both surfaces of the first electrode current collector and the second electrode current collector in a region of the mandrel portion where the first electrode active material layer and the second electrode active material layer face each other.

The separator may be formed in a single unit and may be formed to completely surround the end of the first electrode plate in the mandrel portion.

The first electrode current collector may be formed to extend at least one time so as to surround the outermost part of the electrode assembly and the first electrode current collector and the second electrode current collector face each other at the outermost part of the electrode assembly.

The first electrode current collector and the second electrode current collector may be formed to face each other between the first electrode tab and the second electrode tab of the mandrel portion.

According to another aspect of the present disclosure, there is provided a secondary battery including a case having an internal space; and an electrode assembly inserted into the internal space of the case, wherein the electrode assembly includes a first electrode plate including a first electrode current collector and a first electrode active material layer coated on at least a region of the first electrode current collector; a second electrode plate including a second electrode current collector and a second electrode active material layer coated on at least a region of the second electrode current collector; a separator interposed between the first electrode plate and the second electrode plate; a first electrode tab coupled to a mandrel portion of the first electrode current collector; and a second electrode tab coupled to a mandrel portion of the second electrode current collector, wherein a region of the mandrel portion of the first electrode current collector, where the first electrode tab is formed, faces the wound first electrode plate, a region of the mandrel portion of the second electrode current collector, where the second electrode tab is formed, faces the wound second electrode plate, and the second electrode active material layer is formed on one surface of the second electrode current collector before the second electrode plate is first wound by a first winding turn.

Before the first winding turn of the first electrode plate, the first electrode active material layer may be formed on one surface of the first electrode current collector.

The first electrode active material layer and the second electrode active material layer may be formed to face each other in a region between an extension line of the end of the first electrode plate and an extension line of the end of the second electrode plate in the mandrel portion.

The separator may be formed in a single unit and is formed to completely surround the end of the first electrode plate in the mandrel portion.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
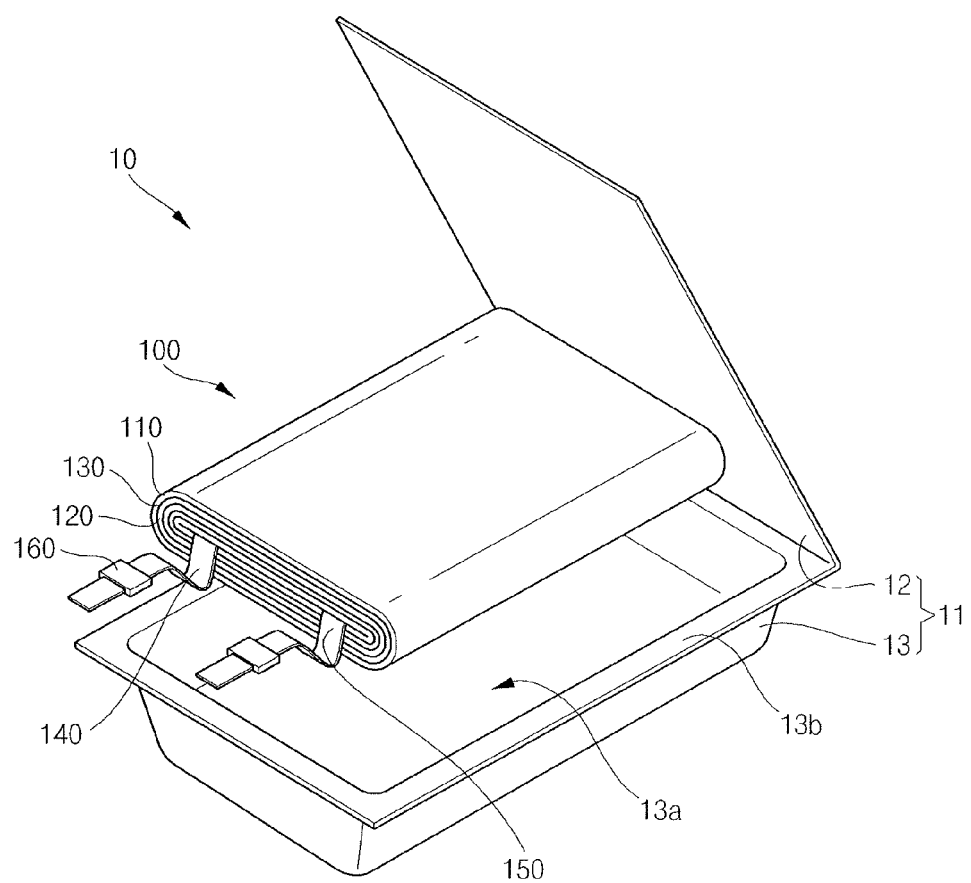
FIG. 1 illustrates an exploded perspective view of a secondary battery according to an embodiment.

Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the exemplary implementations to those skilled in the art.

In the drawing figures, the dimensions of layers and regions may be exaggerated for clarity of illustration. It will also be understood that when a layer or element is referred to as being "on" another layer, element, or substrate, it can be directly on the other layer, element, or substrate, or intervening layers or elements may also be present. In addition, it will also be understood that when a layer or element is referred to as being "between" two layers or elements, it can be the only layer or element between the two layers or elements, or one or more intervening layers or elements may also be present. Like reference numerals refer to like elements throughout. As used herein, the term "and/or" includes any and all combinations of one or more of the associated listed items.

The terminology used herein is for the purpose of describing particular embodiments only and is not intended to be limiting. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure.

Figure 2:
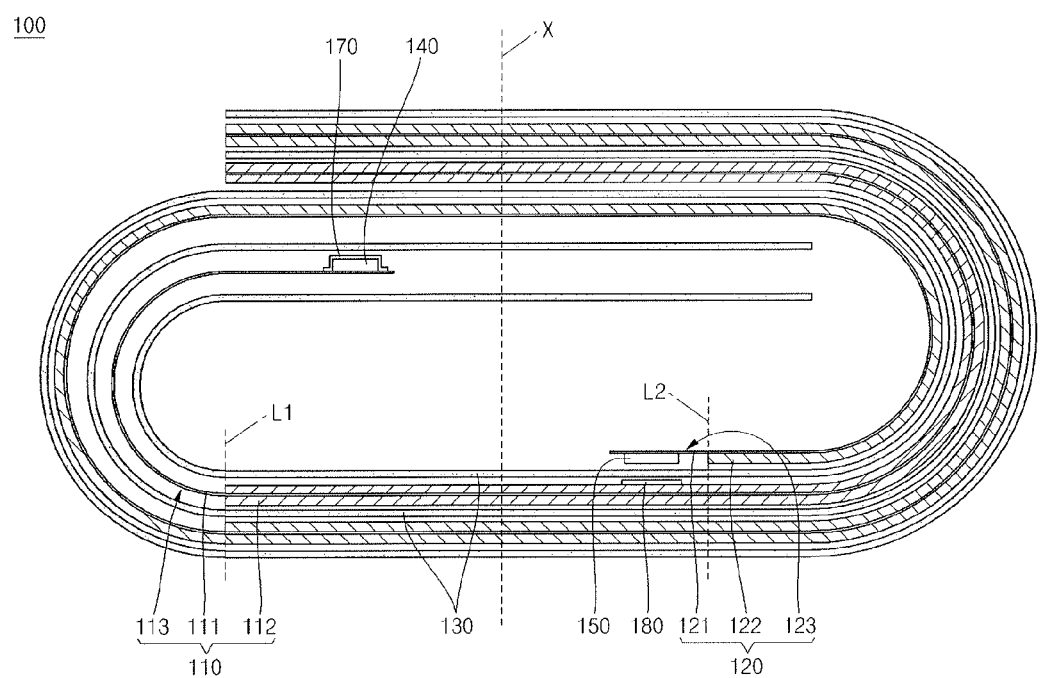
FIG. 2 illustrates a cross-sectional view of an electrode assembly for a secondary battery according to an embodiment.

FIG. 1 is an exploded perspective view of a secondary battery according to an embodiment. FIG. 2 is a cross-sectional view of an electrode assembly for a secondary battery according to an embodiment.

Referring to FIGS. 1 and 2, a secondary battery 10 according to an embodiment may include an electrode assembly 100 and a case 11 accommodating the electrode assembly 100.

The electrode assembly 100 is formed by stacking or winding a structure including a first electrode plate 110, a second electrode plate 120, and a separator 130 interposed therebetween. Here, the first electrode plate 110 may be a positive electrode and the second electrode plate 120 may be a negative electrode, or vice versa.

When the first electrode plate 110 is a positive electrode, the first electrode plate 110 is formed by coating a first electrode active material layer 112 made of a highly conductive metal foil, e.g., an aluminum (Al) foil, on both, i.e., opposite, surfaces of a first electrode current collector 111. Here, the first electrode active material layer 112 may be formed using a chalcogenide compound, and examples thereof may include composite metal oxides, e.g., $LiCoO_2$, $LiMn_2O_4$, $LiNiO_2$, $LiNiMnO_2$, but embodiments are not limited thereto.

A first electrode tab 140 is formed on a first electrode uncoated portion 113 where the first electrode active material layer 112 of the first electrode plate 110 is not formed. One end of the first electrode tab 140 is electrically connected to the first electrode uncoated portion 113, and the other end of the first electrode tab 140 is drawn to the outside of the case 11. An insulation film 160 is attached to a region of the first electrode tab 140 in contact with the case 11. The insulation film 160 may be made of, e.g., polyphenylene sulfide (PPS), polyimide (PI), or polypropylene (PP), but embodiments are not limited thereto.

When the second electrode plate 120 is a negative electrode, the second electrode plate 120 is formed by coating a second electrode active material layer 122 made of a highly conductive metal foil, e.g., a copper (Cu) or nickel (Ni) foil, on both surfaces of a second electrode current collector 121. Here, the second electrode active material layer 122 may be formed using a carbon-series material, e.g., Si, Sn, tin oxide, a tin alloy compound, transition metal oxide, lithium metal nitride, or metal oxide, but embodiments are not limited thereto. A second electrode tab 150 is formed on a second electrode uncoated portion 123 where the second electrode active material layer 122 of the second electrode plate 120 is not formed. One end of the second electrode tab 150 is electrically connected to the second electrode uncoated portion 123, and the other end of the second electrode tab 150 is drawn to the outside of the case 11. The insulation film 160 is attached to a region of the second electrode tab 150 in contact with the case 11.

The separator 130 is interposed between the first electrode plate 110 and the second electrode plate 120 and prevents a short circuit between the first and second electrode plates 110 and 120. In addition, the separator 130 is formed of a porous layer and allows lithium ions to move between the first electrode plate 110 and the second electrode plate 120. The separator 130 may be made of, e.g., polyethylene (PE), polypropylene (PP), and a copolymer of PE and PP, but embodiments are not limited thereto. In order to prevent a short circuit between the first and second electrode plates 110 and 120, the separator 130 may be formed to have a width greater than widths of the first and second electrode plates 110 and 120.

A configuration of the electrode assembly 100 will later be described in more detail.

The electrode assembly 100 and an electrolyte are accommodated in the case 11. During charging and discharging, the electrolyte functions as a moving medium of lithium ions generated by an electrochemical reaction in positive and negative electrodes of the secondary battery. The electrolyte may be a nonaqueous organic electrolyte including a lithium salt and a high purity organic solvent. In addition, the electrolyte may be a polymer electrolyte.

The case 11 includes an upper case 12 and a lower case 13 formed by bending a mid portion of a rectangular pouch film formed in a unit body in a lengthwise direction of one side of the pouch film. A groove 13a for receiving the electrode assembly 100 is formed in the lower case 13 by, e.g., pressing, and a sealing portion 13b is formed for sealing with the upper case 12.

The secondary battery according to an embodiment will now be described in more detail with reference to FIG. 2.

As illustrated in FIG. 2, an imaginary short axis X may extend to cross a center of the electrode assembly 100. The first electrode tab 140 is formed at a first side of the short axis X, and the second electrode tab 150 is formed at a second side of the short axis X, e.g., the first and second electrode tabs 140 and 150 may be at opposite sides of the short axis X of the electrode assembly 100. In addition, the first electrode plate 110 is first wound by a first winding turn at the first side of the short axis X, and the second electrode plate 120 is first wound by a first winding turn at the second side of the short axis X. Here, the winding turn means that an electrode plate is wound in a semi-circular shape, e.g., the first winding turn may be a first semi-circular bend of an electrode plate relative to an interior of the electrode assembly 100.

In addition, in a mandrel portion of the electrode assembly 100, a region of the first electrode current collector 111 that includes the first electrode tab 140 faces the first electrode plate 110 immediately after the first winding turn. Similarly, a region of the second electrode current collector 121 tbbhat includes the second electrode tab 150 faces the second electrode plate 120 immediately after the first winding turn. Here, the mandrel portion means a central, e.g., interior, portion of the electrode assembly 100 where winding of the electrode assembly 100 is started.

The first electrode uncoated portion 113 is formed to extend from an interior end of the first electrode plate 110 positioned at the mandrel portion to a region where the first winding turn is completed. That is, nothing is coated on both surfaces of the first electrode current collector 111 from a most interior end thereof. e.g., from the first electrode tab 140, to an end of the first winding turn of the first electrode plate 110, e.g., where a curving portion of the first electrode current collector 111 becomes linear (at line L1 in FIG. 2). The first electrode active material layer 112 is coated on both surfaces of the first electrode current collector 111 from the end of the first winding turn of the first electrode plate 110, e.g., coating of the first electrode active material layer 112 starts at line L1. Here, coating of the first electrode current collector 111 on both surfaces may mean that an electrode active material layer is formed on both, e.g., opposite, surfaces of a current collector, and coating of the first electrode current collector 111 on one surface may mean that an electrode active material layer is formed on only one surface of a current collector.

The first electrode tab 140 is attached to a region adjacent to the interior end of the first electrode uncoated portion 113 positioned at the mandrel portion. That is, the first electrode tab 140 is attached to a region of the first electrode uncoated portion 113 before the first winding turn is started. Here, the first electrode tab 140 is positioned closer to the short axis X of the electrode assembly 100 than an extension line L1 of a starting point of the first electrode active material layer 112. In addition, the first electrode tab 140 may be formed on one of both surfaces of the first electrode uncoated portion 113, facing the outside of the electrode assembly 100.

A first insulation tape 170 is attached to a top portion of the first electrode tab 140. That is, in order to electrically insulate the first electrode tab 140 and the second electrode plate 120 facing the first electrode tab 140 from each other, the first insulation tape 170 may be formed between the first electrode tab 140 and the second electrode plate 120. No insulation tape is formed on the first electrode uncoated portion 113 opposite to the surface of the first electrode uncoated portion 113, to which the first electrode tab 140 is attached. That is, since the first electrode uncoated portion 113, formed on the surface opposite to the first electrode tab 140, is wound to face the first electrode plate 110, an insulation tape may not be necessarily formed.

The second electrode active material layer 122 of the second electrode plate 120 is coated at a region before the second electrode plate 120 is first wound by a first winding turn, on one surface of the second electrode current collector 121. Here, the second electrode active material layer 122 may be formed on one of both surfaces of the second electrode current collector 121, facing the outside of the electrode assembly 100.

Here, a surface of the second electrode current collector 121, where the second electrode active material layer 122 is not formed, includes a second electrode uncoated portion 123. The second electrode uncoated portion 123, i.e., one uncoated surface of the second electrode current collector 121, may extend until a region where the first electrode active material layer 112 and the second electrode uncoated portion 123 face each other, is reached. That is, the second electrode active material layer 122 is coated on both surfaces of the second electrode plate 120 only from a region corresponding to the extension line L1 of the starting point of the first electrode active material layer 112. In other words, coating of the second electrode active material layer 122 on both surfaces of the second electrode current collector 121 is achieved after the second winding turn of the second electrode plate 120 is completed.

The second electrode tab 150 is attached to a region adjacent to the interior end of the second electrode uncoated portion 123 positioned at the mandrel portion. That is, the second electrode tab 150 is attached to a region of the second electrode uncoated portion 123 before the first winding turn of the second electrode plate 120 is started. Here, the second electrode tab 150 is positioned closer to the short axis X of the electrode assembly 100 than an extension line L2 of a starting point of the second electrode active material layer 122. In addition, the second electrode tab 150 may be formed on the second electrode uncoated portion 123 facing the outside of the electrode assembly 100.

A second insulation tape 180 is attached to a portion of the first electrode active material layer 112, facing a region corresponding to the second electrode tab 150. That is, in order to electrically insulate the second electrode tab 150 and the first electrode active material layer 112 facing the second electrode tab 150 from each other, the second insulation tape 180 may be formed between the second electrode tab 150 and the first electrode active material layer 112. No insulation tape is formed on the second electrode uncoated portion 123 opposite to the surface of the second electrode tab 150, to which the second electrode tab 150 is attached. That is, since the second electrode uncoated portion 123, formed on the surface opposite to the second electrode tab 150, is wound to face the second electrode plate 120, an insulation tape may not be necessarily formed.

The separator 130 is interposed between the first electrode plate 110 and the second electrode plate 120. In particular, the separator 130 may be configured such that its interior end positioned at the mandrel portion is adjacent to a region where the first winding turn of the second electrode plate 120 is completed. In addition, the separator 130 may include at least two separators, e.g., as illustrated in FIG. 2.

The separator 130 may be formed of a porous layer including micropores. Therefore, since the separator 130 includes many spaces to be filled with an electrolyte due to porosity of the separator 130, lithium ions can be easily transferred between positive and negative electrodes. That is, charging and discharging of a secondary battery can be achieved by the transfer of lithium ions between the positive and negative electrodes.

The charging and discharging of the electrode assembly 100 may be performed at a region where the first electrode active material layer 112 and the second electrode active material layer 122 face each other. Therefore, the first and second electrode active material layers 112 and 122 face each other from the extension line L2 of the starting point of the second electrode active material layer 122, and the region where the first electrode active material layer 112 and the second electrode active material layer 122 face each other is an active space where charging and discharging may be performed. In addition, the extension line L1 of the starting point where the coating of the second electrode active material layer 122 on the both surfaces is started is the same as the extension line L1 of the starting point of the first electrode active material layer 112. Therefore, the first electrode active material layer 112 facing the outside of the electrode assembly 100 may also face the second electrode active material layer 122 to become an active space where charging and discharging may be performed.

While the separator 130 is interposed between the first and second electrode active material layers 112 and 122, lithium ions may move due to the porosity of the separator 130, thereby achieving charging and discharging of the electrode assembly 100.

As described above, the interior end of the first electrode plate 110 and the first electrode tab 140 are positioned at the first side of the electrode assembly 100 for a secondary battery according to an embodiment, and the interior end of the second electrode plate 120 and the second electrode tab 150 are positioned at the second side of the electrode assembly 100. In addition, the first winding turn of the first electrode plate 110 is performed at the first side of the electrode assembly 100, and the first winding turn of the second electrode plate 120 is performed at the second side of the electrode assembly 100.

That is, the first and second electrode tabs 140 and 150 of the first and second electrode plates 110 and 120 are positioned at opposite sides of the electrode assembly 100 without overlapping each other vertically or horizontally, e.g., the first and second electrode tabs 140 and 150 may be positioned along a diagonal line crossing the short axis X through the center of the electrode assembly 100, thereby obtaining a thickness reducing effect of the electrode assembly 100. Therefore, space utilization efficiency of the mandrel portion of the electrode assembly 100 may be increased, and the energy density of the electrode assembly 100 may be improved.

Figure 3:
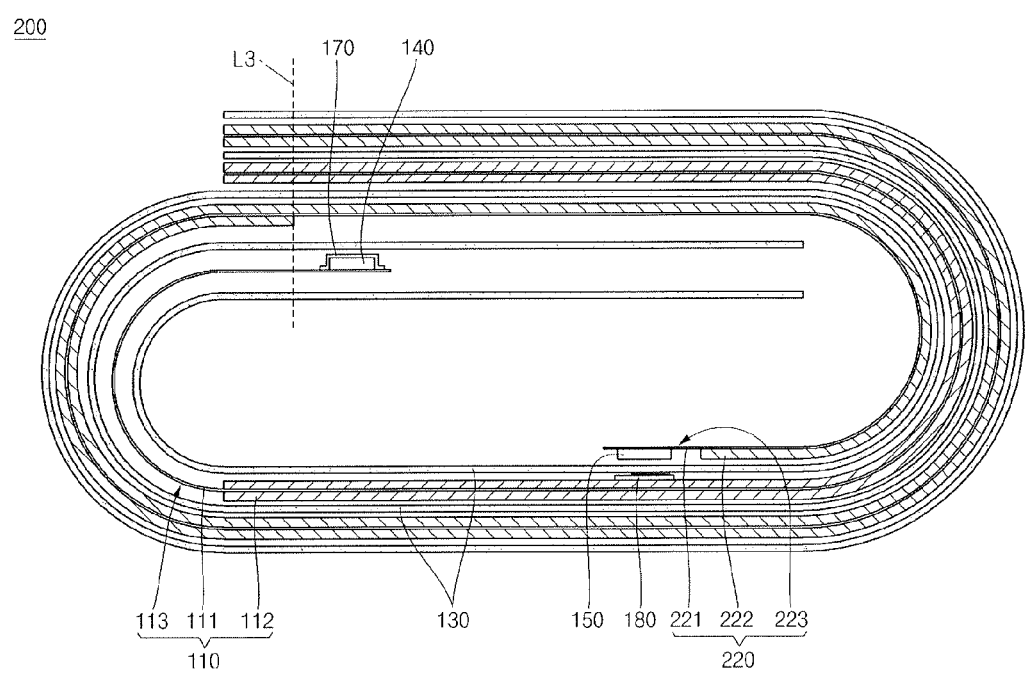
FIG. 3 illustrates a cross-sectional view of an electrode assembly for a secondary battery according to another embodiment.

FIG. 3 is a cross-sectional view of an electrode assembly for a secondary battery according to another embodiment. The same functional components as those of the previous embodiment are denoted by the same reference numerals, and the following description will focus on differences between the previous embodiment and the present embodiment.

Referring to FIG. 3, an electrode assembly 200 for a secondary battery according to another embodiment is formed by winding the first electrode plate 110, the second electrode plate 220, and at least two separators 130 interposed therebetween.

The first electrode plate 110 includes the first electrode current collector 111, the first electrode active material layer 112, and the first electrode uncoated portion 113. In addition, the first electrode tab 140 is attached to the first electrode uncoated portion 113. The second electrode plate 220 includes the second electrode current collector 221, the second electrode active material layer 222, and the second electrode uncoated portion 223. In addition, the second electrode tab 150 is attached to the second electrode uncoated portion 223. Since functional components, except for the second electrode plate 220, are the same as those of the previous embodiment, the following description will focus on the second electrode plate 220.

The second electrode active material layer 222 of the second electrode plate 220 is formed by coating one surface of the second electrode plate 220 before the second electrode plate 220 is first wound by the first winding turn. Here, the second electrode active material layer 222 is formed on one surface of the second electrode current collector 221 that faces the outside of the electrode assembly 200. Here, a surface of the second electrode current collector 221, where the second electrode active material layer 222 is not formed, includes the second electrode uncoated portion 223.

The second electrode uncoated portion 223 may be formed to reach a region between the first winding turn and the second winding turn of the second electrode plate 220. That is, the second electrode active material layer 222 is coated on both surfaces of the second electrode plate 220 from the region between the first winding turn and the second winding turn of the second electrode plate 220. For example, an extension line L3 of a starting point of the coating of the second electrode active material layer 222 on both surfaces is positioned between an extension line of the first electrode tab 140 and the second winding turn of the second electrode plate 220. Here, the first electrode tab 140 and a surface of the second electrode active material layer 222 facing the first electrode tab 140 are formed so as not to overlap each other. That is, the first electrode tab 140 faces the second electrode uncoated portion 223 of the second electrode plate 220.

As described above, in the electrode assembly 200 for a secondary battery according to another embodiment, the second electrode active material layer 222 is coated on both surfaces of the electrode assembly 200 from a region between the first winding turn and the second winding turn of the second electrode plate 220. More specifically, the starting point of the coating of the second electrode active material layer 222 on both surfaces is positioned between the first electrode tab 140 and the starting point of the second winding turn of the second electrode plate 220.

Therefore, a thickness of the electrode assembly 200 can be compensated for at one side of a mandrel portion of the electrode assembly 200, where an active layer is relatively thinly formed. That is, thicknesses of the electrode assembly 200 at the one side and the other side of the electrode assembly 200 are better balanced, thereby improving planarity of the electrode assembly 200.

Figure 4:
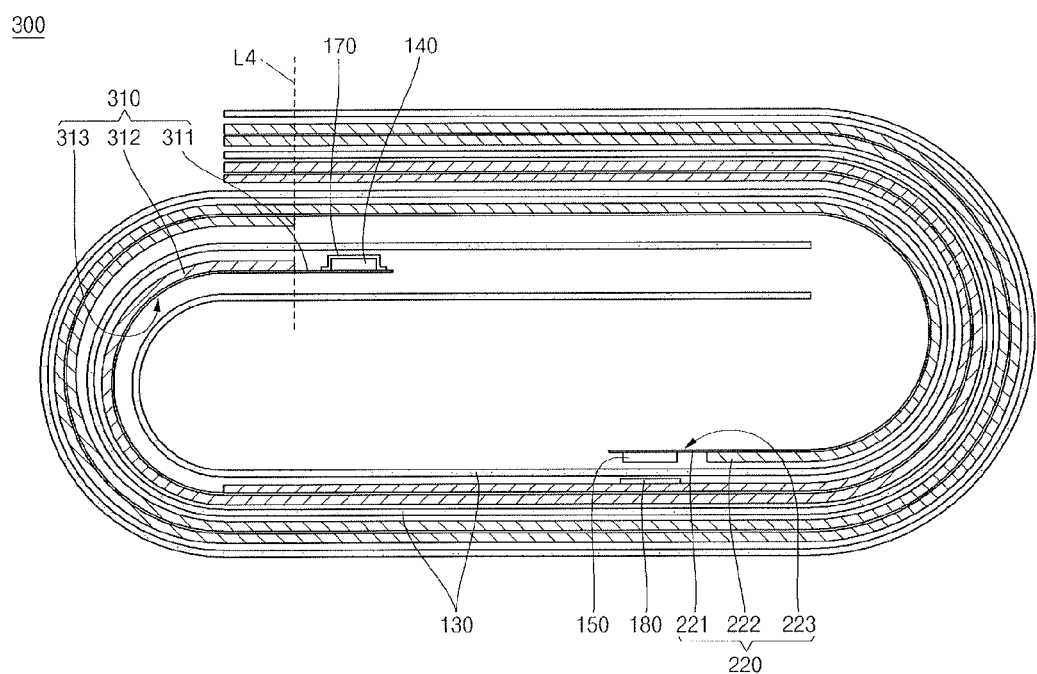
FIG. 4 illustrates a cross-sectional view of an electrode assembly for a secondary battery according to still another embodiment.

FIG. 4 is a cross-sectional view of an electrode assembly for a secondary battery according to still another embodiment. The same functional components as those of the previous embodiment are denoted by the same reference numerals, and the following description will focus on differences between the previous embodiment and the present embodiment.

Referring to FIG. 4, an electrode assembly 300 for a secondary battery according to still another embodiment is formed by winding a first electrode plate 310, the second electrode plate 220, and at least two separators 130 interposed therebetween. Here, the first electrode plate 310 includes a first electrode current collector 311, a first electrode active material layer 312, and a first electrode uncoated portion 313. In addition, the first electrode tab 140 is attached to the first electrode uncoated portion 313. The second electrode plate 220 includes the second electrode current collector 221, the second electrode active material layer 222, and the second electrode uncoated portion 223. In addition, the second electrode tab 150 is attached to the second electrode uncoated portion 223. Since the electrode assembly 300 is substantially the same as the electrode assembly 200, except for the first electrode plate 310, the following description will focus on the first electrode plate 310.

The first electrode active material layer 312 of the first electrode plate 310 is coated on one surface of the first electrode plate 310 at a region before it is first wound by a first winding turn. Here, the first electrode active material layer 312 is formed on one of both surfaces of the first electrode current collector 311, facing the outside of the electrode assembly 300. In addition, an extension line L4 of a starting point where the coating of the first electrode active material layer 312 on the one surface is started is the same as the extension line L4 of a starting point of the coating of the second electrode active material layer 222 on both surfaces.

A surface of the first electrode current collector 311, where the first electrode active material layer 312 is not formed, includes a first electrode uncoated portion 313. The first electrode active material layer 312 may be coated on both surfaces of the first electrode current collector 311 from an end of the first winding turn of the first electrode plate 310.

As described above, in the electrode assembly 300 for a secondary battery according to still another embodiment, the first electrode active material layer 312 is coated on one surface before the first winding turn of the first electrode plate 310 is performed. In particular, the extension line L4 of the starting point where the coating of the first electrode active material layer 312 on the one surface is started is the same as the extension line L4 of the starting point of the coating of the second electrode active material layer 222 on both surfaces.

In other words, the first electrode active material layer 312 and the second electrode active material layer 222 are formed to face each other at a region where the first winding turn of the first electrode plate 310 of the electrode assembly 300 and at a region where the second winding turn of the second electrode plate 210 face each other. That is, an active space where charging and discharging are performed may further be provided at one side of a mandrel portion of the electrode assembly 300. Therefore, space utilization efficiency of the mandrel portion of the electrode assembly 300 may be increased and the capacity of the electrode assembly 300 may be improved.

Figure 5:
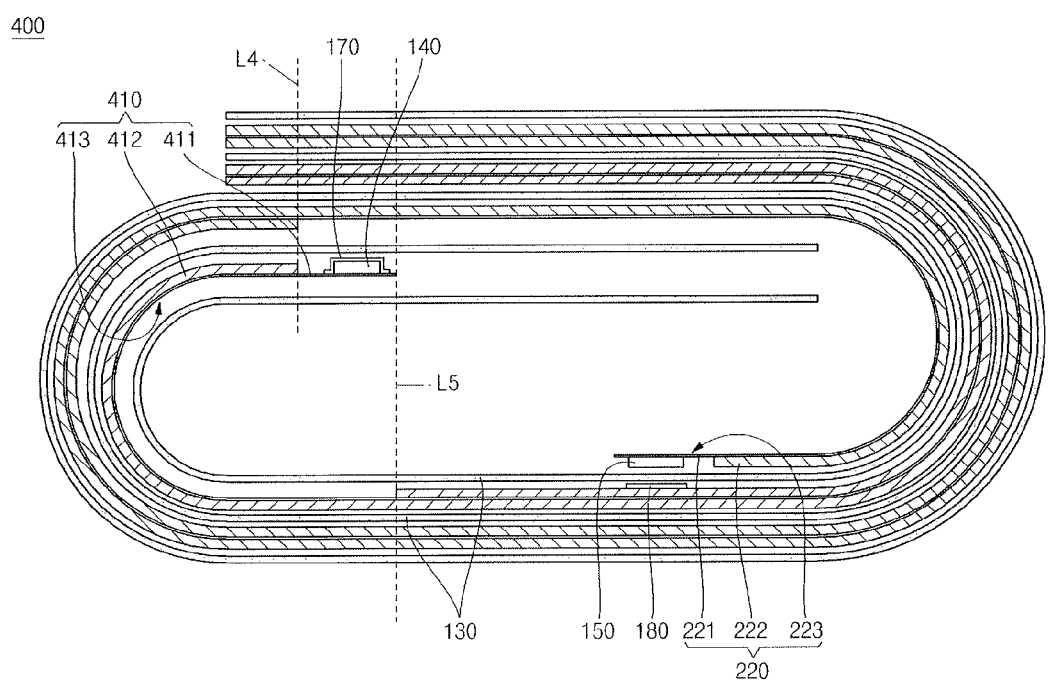
FIG. 5 illustrates a cross-sectional view of an electrode assembly for a secondary battery according to still another embodiment.

FIG. 5 is a cross-sectional view of an electrode assembly for a secondary battery according to still another embodiment. The same functional components as those of the previous embodiment are denoted by the same reference numerals, and the following description will focus on differences between the previous embodiment and the present embodiment.

Referring to FIG. 5, an electrode assembly 400 for a secondary battery according to still another embodiment is formed by winding a first electrode plate 410, the second electrode plate 220, and at least two separators 130 interposed therebetween. Here, the first electrode plate 410 includes a first electrode current collector 411, a first electrode active material layer 412, and a first electrode uncoated portion 413. In addition, the first electrode tab 140 is attached to the first electrode uncoated portion 413. The second electrode plate 220 includes the second electrode current collector 221, the second electrode active material layer 222, and the second electrode uncoated portion 223. In addition, the second electrode tab 150 is attached to the second electrode uncoated portion 223. Since the electrode assembly 400 is substantially the same as the electrode assembly 300, except for the first electrode plate 410, the following description will focus on the first electrode plate 410.

The first electrode active material layer 412 of the first electrode plate 410 is coated on one surface of the first electrode plate 410 at a region before it is first wound by a first winding turn. Here, the first electrode active material layer 412 is formed on one of both surfaces of the first electrode current collector 411, facing the outside of the electrode assembly 400. In addition, an extension line L4 of a starting point where the coating of the first electrode active material layer 412 on the one surface is started is the same as the extension line L4 of a starting point of the coating of the second electrode active material layer 222 on both surfaces.

Meanwhile, a surface of the first electrode current collector 411, where the first electrode active material layer 412 is not formed, includes a first electrode uncoated portion 413. The first electrode active material layer 412 may be coated on both surfaces of the first electrode current collector 411 from a region corresponding to an extension line L5 of an interior end of the first electrode plate 410 after the first winding turn of the first electrode plate 410. Therefore, a surface of the first electrode plate 410, facing the inside of the electrode assembly 400, may include the first electrode uncoated portion 413 at one side of the extension line L5.

As described above, in the electrode assembly 400 for a secondary battery according to still another embodiment, the starting point of the coating of the first electrode active material layer 412 on both surfaces is made to be the same as the extension line L5 of the interior end of the first electrode plate 410. That is, facing regions of a mandrel portion of the electrode assembly 400, from which the first electrode plate 410 is wound, may include a first electrode uncoated portion 413.

Since the first electrode plate 410 has the facing regions at the first winding turn region, which are a non-active space where charging and discharging are not performed because the first electrode plate 410 is not facing the second electrode plate 220, the first electrode active material layer 412 is not formed in a non-active space. Therefore, a thickness reducing effect of the electrode assembly 400 can be achieved and space utilization efficiency of the mandrel portion can be increased.

Figure 6A:
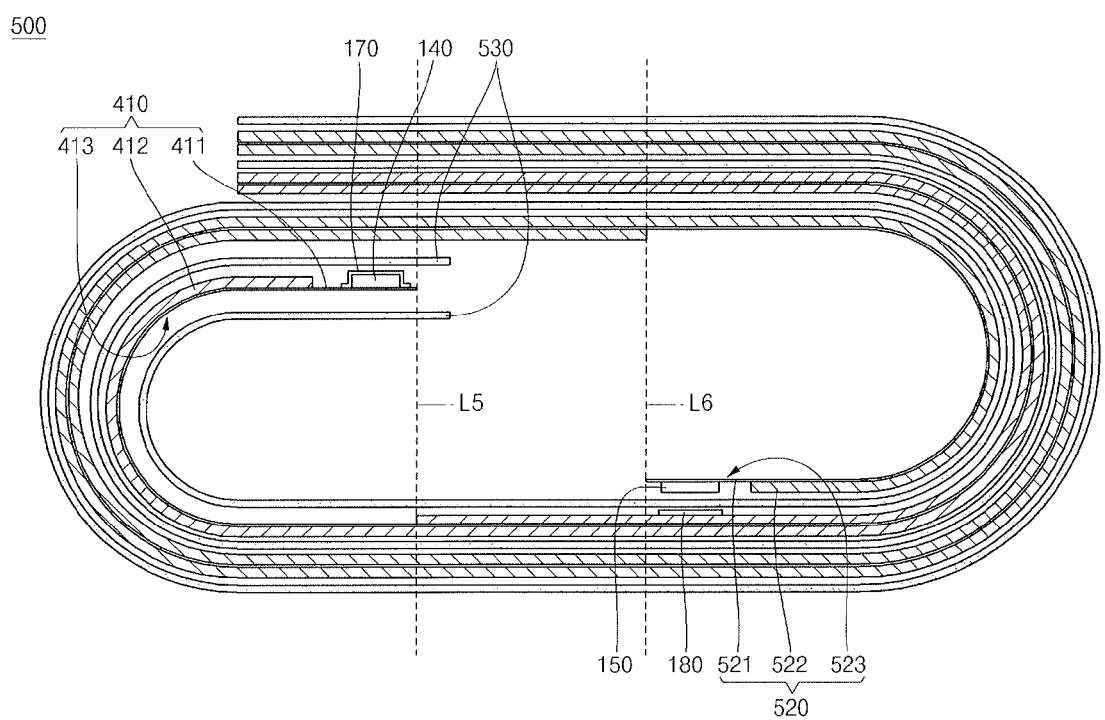
FIGS. 6A and 6B illustrate cross-sectional views of an electrode assembly for a secondary battery according to still another embodiment.
Figure 6B:
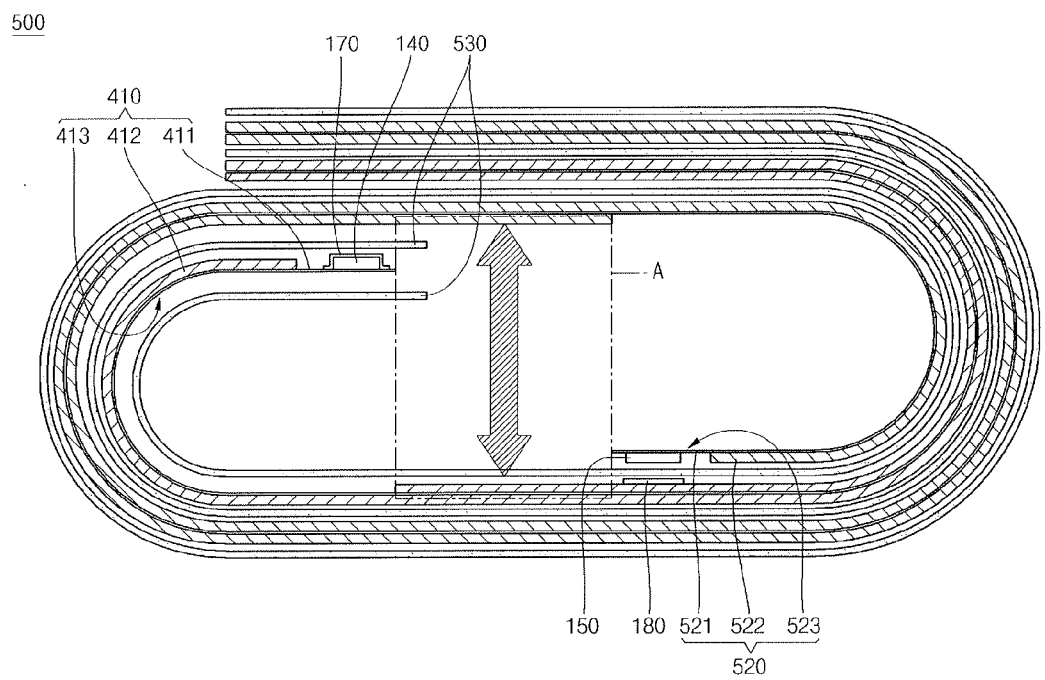

FIGS. 6A and 6B are cross-sectional views of an electrode assembly for a secondary battery according to still another embodiment. The same functional components as those of the previous embodiment are denoted by the same reference numerals, and the following description will focus on differences between the previous embodiment and the present embodiment.

Referring to FIGS. 6A and 6B, the electrode assembly 500 for a secondary battery according to still another embodiment is formed by winding the first electrode plate 410, a second electrode plate 520, and at least two separators 530 interposed therebetween. Here, the first electrode plate 410 includes the first electrode current collector 411, the first electrode active material layer 412, and a first electrode uncoated portion 413. In addition, the first electrode tab 140 is attached to the first electrode uncoated portion 413. The second electrode plate 520 includes a second electrode current collector 521, a second electrode active material layer 522, and a second electrode uncoated portion 523. In addition, a second electrode tab 150 is attached to the second electrode uncoated portion 523. Since the electrode assembly 500 is substantially the same as the electrode assembly 400, except for the second electrode plate 520 and the separator 530, the following description will focus on the second electrode plate 520 and the separator 530.

The second electrode active material layer 522 of the second electrode plate 520 is coated on one surface of the second electrode plate 520 at a region before it is first wound by a first winding turn. Here, the second electrode active material layer 522 is formed on one of both surfaces of the second electrode current collector 521, facing the outside of the electrode assembly 500.

A surface of the second electrode current collector 521, where the second electrode active material layer 522 is not formed, includes a second electrode uncoated portion 523. The second electrode active material layer 522 may be coated on both surfaces of the second electrode plate 520 from a region corresponding to an extension line L6 of an interior end of the second electrode plate 520 after the first winding turn of the second electrode plate 520 is completed.

That is, the first electrode active material layer 412 is coated on both surfaces of the first electrode plate 410 from the extension line L5 of the end of the first electrode plate 410, and the second electrode active material layer 522 is coated on both surfaces of the second electrode plate 520 from the extension line L6 of the end of the second electrode plate 520. Therefore, the first electrode active material layer 412 and the second electrode active material layer 522 face each other between the extension line L5 of the end of the first electrode plate 410 and the extension line L6 of the end of the second electrode plate 520.

Referring to FIG. 6B, in the mandrel portion of the electrode assembly 500, an active space A, where the first and second electrode active material layers 412 and 522 face each other, is formed between the ends of the first and second electrode plates 410 and 520. In the active space A, as indicated by an arrow, charging and discharging of a secondary battery may be performed by transfer of lithium ions between the first and second electrode plates 410 and 520. That is, since the active space A, where charging and discharging of the electrode assembly 500 are performed, is additionally formed in the mandrel portion, the capacity of the electrode assembly 500 can be increased.

An interior end of the separator 530 is positioned to be adjacent to a region corresponding to the extension line L5 of the end of the first electrode plate 410. In detail, the end of the separator 530 may be positioned to protrude slightly more than the end of the first electrode plate 410.

As described above, in the electrode assembly 500 according to still another embodiment, the first and second electrode active material layers 412 and 522 are formed to face each other between the extension line L5 of the interior end of the first electrode plate 410 and the extension line L6 of the end of the second electrode plate 520. That is, the region may become an active space where charging and discharging of the electrode assembly 500 may be performed.

In addition, an end of the separator 530 may be positioned to protrude slightly more than the extension line L5 of the interior end of the first electrode plate 410. That is, the end of the separator 530 does not excessively protrude from the end of the first electrode plate 410.

That is, an active space where charging and discharging are performed may further be provided at the center of a mandrel portion of the electrode assembly 500. Therefore, space utilization efficiency of the mandrel portion of the electrode assembly 500 may be increased and the capacity of the electrode assembly 500 may be improved. In addition, since the end of the separator 530 does not excessively protrude, the thickness of the electrode assembly 500 can be reduced.

In addition, regions where the first electrode tab 140 and the second electrode tab 150 are formed may function as non-active spaces, and one side, the other side, and the center of the mandrel portion are positioned such that the first and second electrode active material layers 412 and 522 face each other, thereby functioning as active spaces. Since the first and second electrode tabs 140 and 150 are relatively thick, thicknesses of regions where the first and second electrode tabs 140 and 150 are positioned may be increased when the winding of the electrode assembly 500 is completed. Meanwhile, as charging and discharging of the electrode assembly 500 are repeatedly performed, swelling occurs, increasing the thickness of the electrode assembly 500.

Therefore, since the thicknesses of the one side, the other side. and the center of the mandrel portion, which are active spaces, are increased, a thickness difference of the electrode assembly 500 due to initial thicknesses of the first and second electrode tabs 140 and 150 may be compensated. That is, since the overall planarity of the electrode assembly 500 is increased by continuously repeated operations of charging and discharging, an extended life of the secondary battery can be advantageously achieved.

Figure 7:
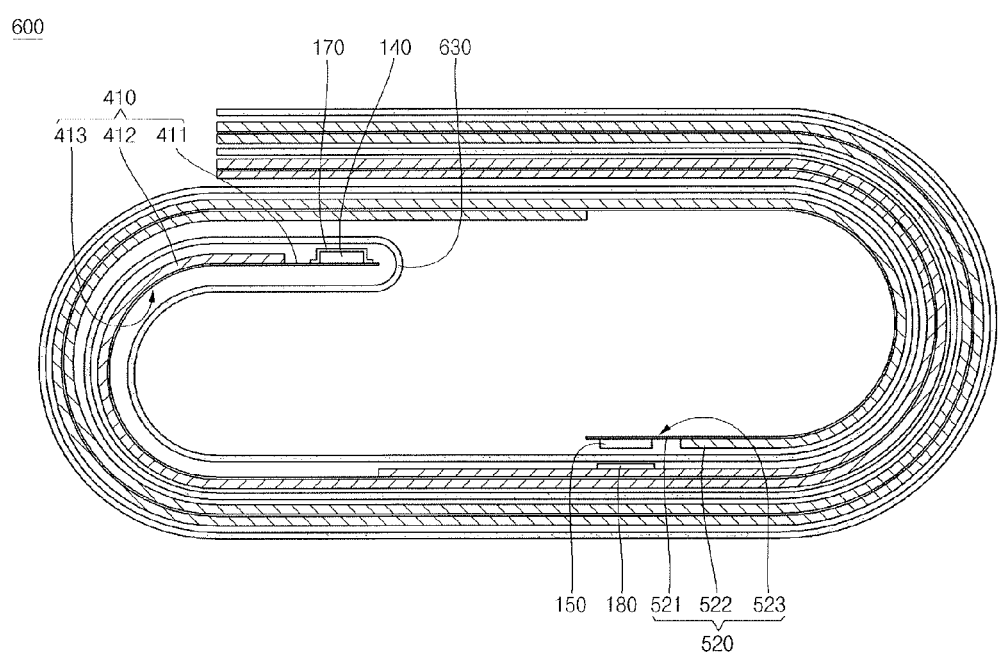
FIG. 7 illustrates a cross-sectional view of an electrode assembly for a secondary battery according to still another embodiment.

FIG. 7 is a cross-sectional view of an electrode assembly for a secondary battery according to still another embodiment. The same functional components as those of the previous embodiment are denoted by the same reference numerals, and the following description will focus on differences between the previous embodiment and the present embodiment.

Referring to FIG. 7, the electrode assembly 600 for a secondary battery according to still another embodiment is formed by winding the first electrode plate 410, the second electrode plate 520, and a separator 630 interposed therebetween. Here, the first electrode plate 410 includes the first electrode current collector 411, the first electrode active material layer 412, and the first electrode uncoated portion 413. In addition, the first electrode tab 140 is attached to the first electrode uncoated portion 413. The second electrode plate 520 includes the second electrode current collector 521, the second electrode active material layer 522, and the second electrode uncoated portion 523. In addition, the second electrode tab 150 is attached to the second electrode uncoated portion 523. Since the electrode assembly 600 is substantially the same as the electrode assembly 500, except for the separator 630, the following description will focus on the separator 630.

The separator 630 is formed to completely surround an interior end of the electrode assembly 600. That is, unlike in the previous embodiment in which two separators are disposed on both surfaces of the first electrode plate 410, the separator 630 includes a single separator.

In detail, the separator 630, which is a single separator, may be wound in a state in which it is folded to surround an end of the first electrode plate 410. Alternatively, two separators may be disposed on both surfaces of the first electrode plate 410 and ends of the two separators may be welded to be formed in a single body, followed by winding.

As described above, winding of the electrode assembly 600 is performed in a state in which the end of the first electrode plate 410 is completely surrounded by the separator 630 formed in a single body. Here, the winding of the electrode assembly 600 is performed while the end of the folded separator 630 is fixed. That is, since the first electrode plate 410 is not exposed by the separator 630, it is possible to protect the first electrode plate 410 during winding, thereby ultimately improving the degree of completion of the electrode assembly 600.

In addition, since the electrode assembly 600 is different from the electrode assembly 500 only in view of a configuration of the separator 630, the electrode assembly 600 and the electrode assembly 500 exert substantially the same effect in view of space utilization efficiency of the mandrel portion of the electrode assembly, an increase in the capacity, a reduction in the thickness, an improvement in the planarity, and an improvement in the degree of completion. With this configuration, the electrode assembly 600 according to still another embodiment may exert the highest performance in view of increased capacity, reduced thickness, improved planarity, and improved degree of completion.

Figure 8:
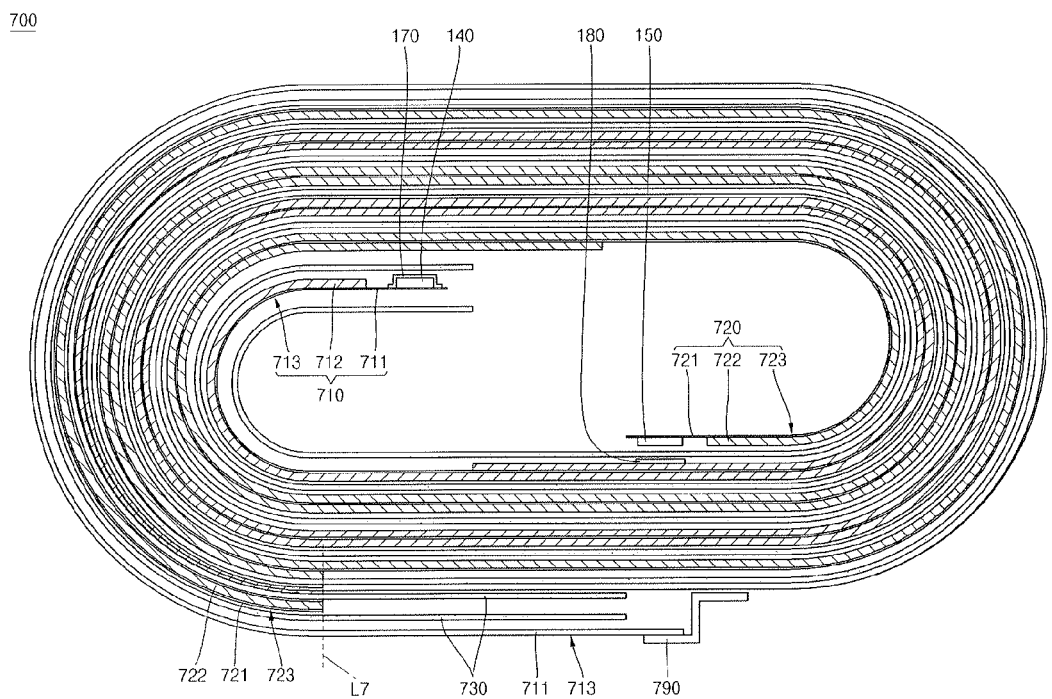
FIG. 8 illustrates a cross-sectional view of an electrode assembly for a secondary battery according to still another embodiment.

FIG. 8 is a cross-sectional view of an electrode assembly for a secondary battery according to still another embodiment. The same functional components as those of the previous embodiment are denoted by the same reference numerals, and the following description will focus on differences between the previous embodiment and the present embodiment.

Referring to FIG. 8, the electrode assembly 700 for a secondary battery according to still another embodiment is formed by winding a first electrode plate 710, a second electrode plate 720, and a separator 730 interposed therebetween. Here, the first electrode plate 710 includes a first electrode current collector 711, a first electrode active material layer 712, and a first electrode uncoated portion 713. In addition, the first electrode tab 140 is attached to the first electrode uncoated portion 713. The second electrode plate 720 includes a second electrode current collector 721, a second electrode active material layer 722, and a second electrode uncoated portion 723. In addition, the second electrode tab 150 is attached to the second electrode uncoated portion 723. Since a configuration of a mandrel portion of the electrode assembly 700 is the same as that of the previous embodiment (see FIG. 6A.), repeated explanations thereof will not be given, and the following description will focus on a configuration of the outermost part of the electrode assembly 700. In addition, the configuration of the electrode assembly 700 is not limited to that illustrated in the embodiment of FIG. 6A, and the electrode assembly 700 may have any of the configurations illustrated in the preceding embodiments.

The electrode assembly 700 may be formed such that its outermost part is surrounded by the first electrode current collector 711. That is, the outermost part of the electrode assembly 700 is surrounded by the first electrode uncoated portion 713. Here, the first electrode uncoated portion 713 is wound to surround the outer surface of the electrode assembly 700 at least one time.

In detail, exterior ends of the first and second electrode active material layers 712 and 722 are positioned on the same extension line L7. In addition, an exterior end of the second electrode current collector 721 is also positioned on the extension line L7 and an exterior end of the separator 730 is positioned to extend slightly more than the extension line L7. The second electrode active material layer 722 is coated only one surface of the second electrode plate 720 positioned on the outermost part. That is, a surface of the second electrode plate 720, positioned on the outermost part and facing the outside of the electrode assembly 700, may include the second electrode uncoated portion 723. In addition, the first electrode current collector 711, i.e., the first electrode uncoated portion 713, extends from the extension line L7 to entirely surround the electrode assembly 700. Therefore, the first electrode uncoated portion 713 and the second electrode uncoated portion 723 are formed to face each other at the outermost part of the electrode assembly 700. A finishing tape 790 may be attached to an end of the wound electrode assembly 700.

As described above, the electrode assembly 700 is configured such that the first and second electrode uncoated portions 713 and 723 face each other at the outermost part of the electrode assembly. Therefore, when a foreign material, such as a nail, penetrates the electrode assembly 700, a short circuit may be caused between first and second electrode current collectors 711 and 721, thereby improving penetration stability.

Figure 9:
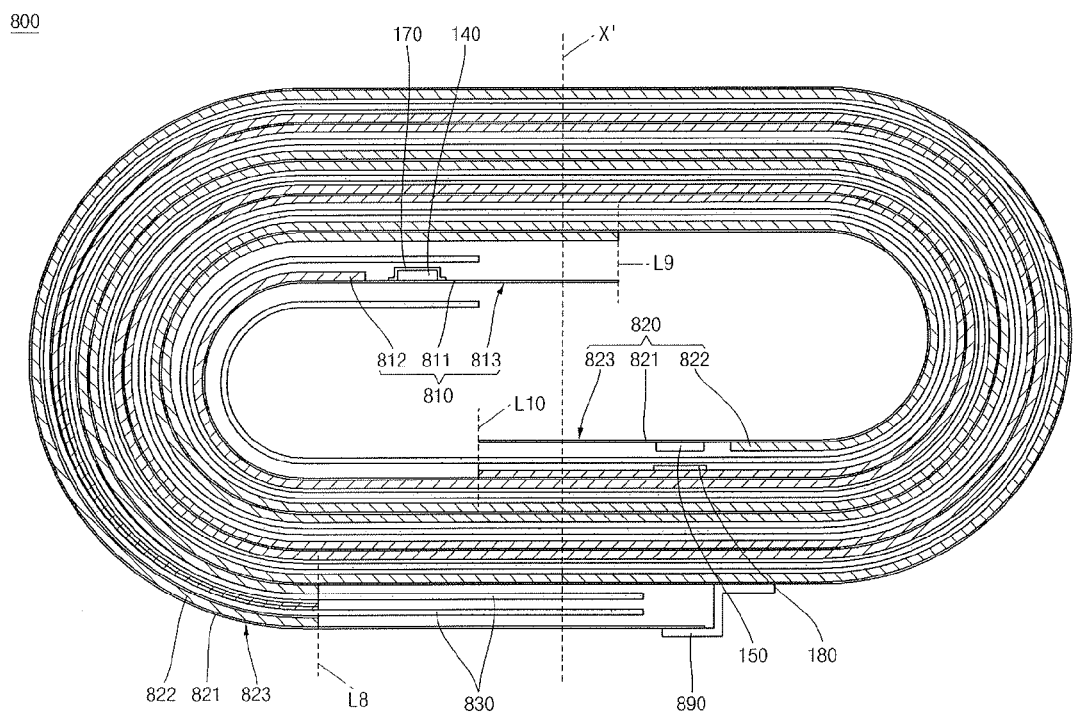
FIG. 9 illustrates a cross-sectional view of an electrode assembly for a secondary battery according to still another embodiment.

FIG. 9 is a cross-sectional view of an electrode assembly for a secondary battery according to still another embodiment. The same functional components as those of the previous embodiment are denoted by the same reference numerals, and the following description will focus on differences between the previous embodiment and the present embodiment.

Referring to FIG. 9, the electrode assembly 800 for a secondary battery according to still another embodiment is formed by winding a first electrode plate 810, a second electrode plate 820, and a separator 830 interposed therebetween. Here, the first electrode plate 810 includes a first electrode current collector 811, a first electrode active material layer 812 and a first electrode uncoated portion 813. In addition, a first electrode tab 140 is attached to the first electrode uncoated portion 813. The second electrode plate 820 includes a second electrode current collector 821, a second electrode active material layer 822 and a second electrode uncoated portion 823. In addition, a second electrode tab 150 is attached to the second electrode uncoated portion 823. Since a configuration of a mandrel portion of the electrode assembly 800 is the same as that of the previous embodiment, except for configurations of the first and second electrode current collectors 811 and 821 and the outermost part of the electrode assembly 800, repeated explanations thereof will not be given, and the following description will focus on the configurations thereof.

First, the electrode assembly 800 may be formed such that its outermost part is surrounded by the second electrode current collector 821. That is, the outermost part of the electrode assembly 800 is surrounded by the second electrode uncoated portion 823.

In detail, exterior ends of the first and second electrode active material layers 812 and 822 are positioned on the same extension line L8. In addition, an exterior end of the second electrode current collector 821 is also positioned on the extension line L8 and an exterior end of the separator 830 is positioned to extend slightly more than the extension line L8. The second electrode active material layer 822 is coated only one surface of the second electrode plate 820 positioned on the outermost part. That is, a surface of the second electrode plate 820, positioned at the outermost part and facing the outside of the electrode assembly 800, may include the second electrode uncoated portion 823. In addition, the second electrode current collector 821, specifically, an end of the second electrode uncoated portion 823, extends from the extension line L8 slightly more than the end of the separator 830. A finishing tape 890 may be attached to an end of the wound electrode assembly 800.

In a mandrel portion of the electrode assembly 800, an interior end of the first electrode current collector 811 extends up to the other side of the short axis X' of the center of the electrode assembly 800. In addition, an interior end of the second electrode current collector 821 extends up to one side of the short axis X' of the center of the electrode assembly 800. Here, the first electrode tab 140 and the second electrode tab 150 are positioned at one side and the other side of the short axis X'. That is, the first electrode current collector 811 and the second electrode current collector 821 face each other between the first electrode tab 140 and the second electrode tab 150.

In detail, the interior end of the first electrode current collector 811 may be positioned to be adjacent to an extension line L9 of a starting point of coating of the second electrode active material layer 822 on both surfaces. In addition, the interior end of the second electrode current collector 821 may be positioned to be adjacent to an extension line L10 of a starting point of coating of the first electrode active material layer 812 on both surfaces. That is, in the mandrel portion of the electrode assembly 800, the first and second electrode current collectors 811 and 821, specifically, the first and second electrode uncoated portions 813 and 823, are formed to face each other.

In particular, the first electrode current collector 811 is formed so as not to overlap a region where the second electrode tab 150 is formed, and the second electrode current collector 821 is preferably formed so as not to overlap a region where the first electrode tab 140 is formed, which is for the purpose of minimizing the thickness of the electrode assembly 800 due to overlapping between the first and second electrode current collectors 811 and 821 and the first electrode tab 140 and the second electrode tab 150.

As described above, the electrode assembly 800 according to still another embodiment is configured such that the first and second electrode uncoated portions 813 and 823 are formed to directly face each other in the mandrel portion. Therefore, when a foreign material, such as a nail, penetrates the electrode assembly 800, a short circuit may be caused between first and second electrode current collectors 811 and 821, thereby improving penetration stability.

Meanwhile, when a length of a space between the first electrode tab 140 and the second electrode tab 150 is relatively large, an active space of the mandrel portion may be increased, and when the length of the space between the first electrode tab 140 and the second electrode tab 150 is small, the active space of the mandrel portion may be decreased, but aspects of embodiments are not limited thereto.

Figure 10:
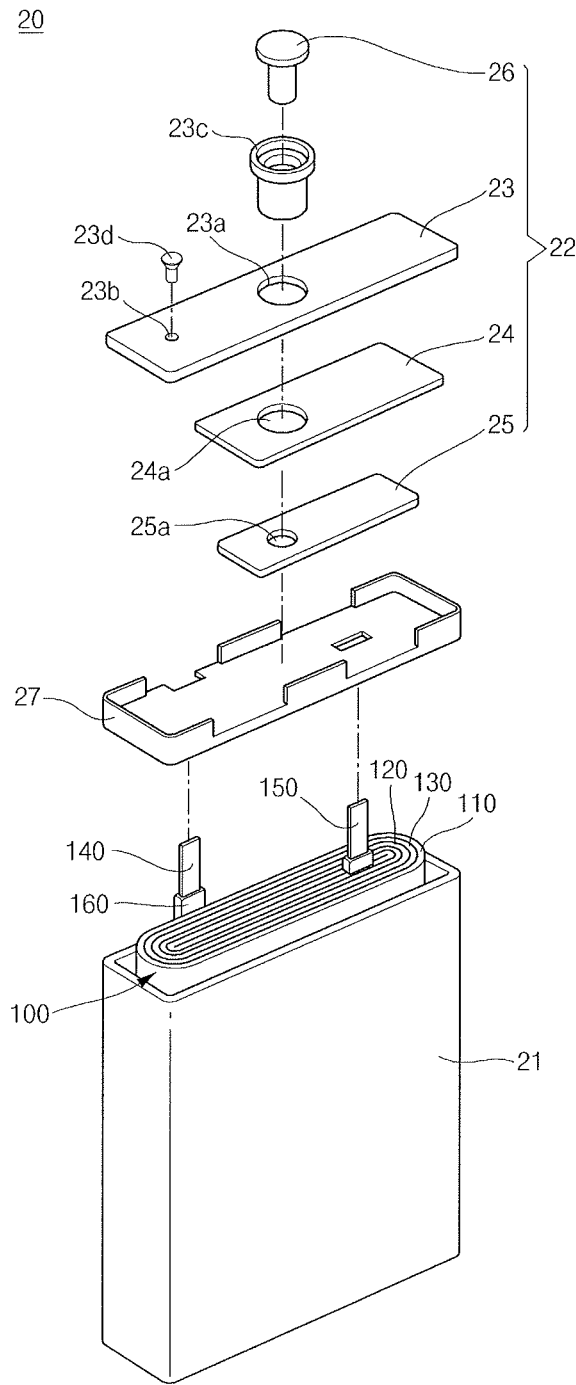
FIG. 10 illustrates an exploded perspective view of an electrode assembly for a secondary battery according to another embodiment.

FIG. 10 is an exploded perspective view of an electrode assembly for a secondary battery according to still another embodiment. The same functional components as those of the previous embodiment are denoted by the same reference numerals, and the following description will focus on differences between the previous embodiment and the present embodiment.

Referring to FIG. 10, the secondary battery 20 according an embodiment includes the electrode assembly 100, a case 21, a cap assembly 22, and an insulating case 27. The secondary battery 20 including the electrode assembly 100 according to the embodiment shown in FIG. 2 is illustrated in FIG. 10. However, in some cases, the secondary battery 20 may be configured to include any of the electrode assemblies according to the embodiments shown in FIGS. 3 to 9. In some cases, the secondary battery including any of the aforementioned electrode assemblies may be a pouch type secondary battery (FIG. 1), a prismatic secondary battery (FIG. 10), a cylindrical secondary battery, or the like.

The electrode assembly 100 is formed by stacking or winding a first electrode plate 110, a second electrode plate 120 and a separator 130 interposed therebetween. Since the electrode assembly 100 has been described above in the preceding embodiment, repeated explanations thereof will not be given.

The case 21 has a top-end opening and is shaped of a substantially rectangular parallelepiped. The electrode assembly 100 and an electrolyte (not shown) are accommodated in the case 21. The case 21 is formed, e.g., by deep drawing, and is made of at lest one of, e.g., steel, aluminum, and equivalents thereof, but embodiments are not limited thereto.

The cap assembly 22 includes a cap plate 23, an insulation plate 24, a terminal plate 25 and an electrode terminal 26. The cap assembly 22 combined with a separately provided insulating case 27 may be coupled to the top-end opening of the case 21 and may seal the case 21.

The cap plate 23 may be formed of a metal plate sized and shaped to correspond to the top-end opening of the case 21. A first electrode tab 140 of the electrode assembly 100, having passed through the insulating case 27, may be welded to a bottom surface of the cap plate 23. That is, the cap plate 23 and the first electrode tab 140 of the electrode assembly 100 have the same polarity.

A terminal through hole 23*a* passing through a region between top and bottom surfaces of the cap plate 23 is formed at the center of the cap plate 23, and an electrode terminal 26 is inserted into and coupled to the terminal through hole 23*a*. In order to insulate the electrode terminal 26 and the cap plate 23 from each other, a tubular gasket 23*c* is mounted in an inner surface of the terminal through hole 23*a*. The gasket 23*c* is closely adhered to a portion between the terminal through hole 23*a* and the electrode terminal 26 and electrically disconnects the electrode terminal 26 and the cap plate 23 from each other.

An electrolyte injection hole 23*b*, assembled to the top-end opening of the case 21 for injecting an electrolyte into an internal space of the case 21, may further be provided at one side of the cap plate 23. In addition, the electrolyte injection hole 23*b* is sealed by a plug 23*d* after the electrolyte is injected into the case 21.

The insulation plate 24 is made of an insulating material and is interposed between the cap plate 23 and the terminal plate 25 to electrically disconnect the cap plate 23 and the terminal plate 25 from each other. The insulation plate 24 includes a terminal through hole 24*a* located to correspond to the terminal through hole 23*a* of the cap plate 23 to allow the electrode terminal 26 to be inserted into the terminal through hole 24*a*. The insulation plate 24 is combined with the electrode terminal 26 such that the electrode terminal 26 is inserted into and coupled to the terminal through hole 24*a* of the insulation plate 24.

The terminal plate 25 may be formed of a metal plate having a top surface closely adhered to a bottom surface of the insulation plate 24. The terminal plate 25 has a bottom surface facing a top surface of the insulating case 27. That is, the terminal plate 25 is interposed between the insulation plate 24 and the insulating case 27. The terminal plate 25 is electrically disconnected from the cap plate 23 by the insulation plate 24. The bottom surface of the terminal plate 25 is welded to the second electrode tab 150 of the electrode assembly 100 having passed through the insulating case 27, and the terminal plate 25 and the second electrode tab 150 may have the same polarity.

The terminal plate 25 is provided with a terminal through hole 25*a* located to correspond to the terminal through hole 23*a* of the cap plate 23 to allow the electrode terminal 26 to be inserted into the terminal through hole 25*a*. The electrode terminal 26 is inserted into and coupled to the terminal through hole 25*a* of the terminal plate 25.

The electrode terminal 26 is inserted to pass through the terminal through holes 23*a*, 24*a* and 25*a* of the cap plate 23, the insulation plate 24 and the terminal plate 25. The electrode terminal 26 may be formed of a cylindrical metal pin. The electrode terminal 26 is electrically connected to the second electrode tab 150 of the electrode assembly 100 through the terminal plate 25. When the electrode terminal 26 is inserted into the terminal through hole 23*a* of the cap plate 23, it is electrically insulated from the cap plate 23 by the gasket 23*c*. Meanwhile, the first electrode tab 140 may be coupled to the electrode terminal 26 using a manufacturing method of the electrode assembly 100. The electrode terminal 26 is generally formed as a negative electrode terminal. However, the electrode terminal 26 may be formed as a positive electrode terminal according to the configuration of secondary battery.

The insulating case 27 is made of an insulating material and is interposed between the cap assembly 22 and the electrode assembly 100 to electrically insulate the cap assembly 22 and the electrode assembly 100 from each other. In addition, the insulating case 27 includes tab holes to allow the first electrode tab 140 and the second electrode tab 150 of the electrode assembly 100 to protrude upwardly. That is, the insulating case 27 may electrically disconnect the cap assembly 22 from a top end of the electrode assembly 100, from which the first electrode tab 140 and the second electrode tab 150 of the electrode assembly 100 are drawn.

By way of summation and review, the present disclosure provides an electrode assembly having a reduced thickness and an increased capacity by efficiently configuring a mandrel portion, and a secondary battery having the electrode assembly. That is, as described above, in the electrode assembly and the secondary battery having the same according to the present disclosure, the first electrode active material layer and the second electrode active material layer are formed to face each other at a region between the first electrode tab and the second electrode tab in the mandrel portions, thereby increasing the capacity of the electrode assembly. In addition, an active material is not formed on a region where the same electrode plates face each other in the mandrel portions, thereby reducing the thickness of the electrode assembly.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electrode assembly for a secondary battery, the electrode assembly comprising:
    a first electrode plate including a first electrode current collector and a first electrode active material layer on at least a region of the first electrode current collector;
    a second electrode plate including a second electrode current collector and a second electrode active material layer on at least a region of the second electrode current collector;
    a separator between the first electrode plate and the second electrode plate;
    a first electrode tab coupled to the first electrode current collector in a mandrel portion of the electrode assembly, the first electrode tab being on a surface of the first electrode current collector that faces away from an interior of the electrode assembly; and a second electrode tab coupled to the second electrode current collector in a mandrel portion of the electrode assembly, the second electrode tab being on a surface of the second electrode current collector that faces away from the interior of the electrode assembly, wherein a region of the first electrode current collector including the first electrode tab faces a wound first electrode plate, wherein a region of the second electrode current collector including the second electrode tab faces a wound second electrode plate, and wherein the second electrode active material layer is only on one surface of the second electrode current collector in a region preceding a first winding turn of the second electrode plate.

2. The electrode assembly as claimed in claim 1, wherein the second electrode active material layer is on a surface of the second electrode current collector, which faces an outer side of the electrode assembly.

3. The electrode assembly as claimed in claim 1, wherein after a first winding turn of the first electrode plate, the first electrode active material layer is on two surfaces of the first electrode current collector.

4. The electrode assembly as claimed in claim 3, wherein after a second winding turn of the second electrode plate, the second electrode active material layer is on two surfaces of the second electrode current collector from a region corresponding to the first electrode active material layer.

5. The electrode assembly as claimed in claim 1, wherein the second electrode active material layer is on two surfaces of the second electrode current collector between the first winding turn and the second winding turn of the second electrode plate.

6. The electrode assembly as claimed in claim 1, wherein, before the first winding turn of the first electrode plate, the first electrode active material layer is on one surface of the first electrode current collector, and the first electrode active material layer is on a surface of the first electrode current collector, facing the outside of the electrode assembly.

7. The electrode assembly as claimed in claim 1, wherein the second electrode active material layer is on both surfaces of the second electrode current collector between the first winding turn and the second winding turn of the second electrode plate from a region corresponding to the first electrode active material layer.

8. The electrode assembly as claimed in claim 1, wherein the first electrode active material layer is on two surfaces of the first electrode current collector from a region corresponding to an extension line of the end of the first electrode plate positioned at the mandrel portion between the first winding turn and the second winding turn of the first electrode plate.

9. The electrode assembly as claimed in claim 1, wherein the first electrode active material layer and the second electrode active material layer face each other in a region between an extension line of the end of the first electrode plate and an extension line of the end of the second electrode plate in the mandrel portion.

10. The electrode assembly as claimed in claim 9, wherein the first electrode active material layer and the second electrode active material layer are on two surfaces of the first electrode current collector and the second electrode current collector in a region of the mandrel portion where the first electrode active material layer and the second electrode active material layer face each other.

11. The electrode assembly as claimed in claim 1, wherein the separator is a single unit completely surrounding an end of the first electrode plate in the mandrel portion.

12. The electrode assembly as claimed in claim 1, wherein the first electrode current collector extends at least one time so as to surround an outermost part of the electrode assembly, and the first electrode current collector and the second electrode current collector face each other at the outermost part of the electrode assembly.

13. The electrode assembly as claimed in claim 1, wherein the first electrode current collector and the second electrode current collector face each other between the first electrode tab and the second electrode tab of the mandrel portion.

14. A secondary battery, comprising:
a case having an internal space; and
an electrode assembly inserted into the internal space of the case, wherein the electrode assembly includes:
a first electrode plate including a first electrode current collector and a first electrode active material layer on at least a region of the first electrode current collector,
a second electrode plate including a second electrode current collector and a second electrode active material layer on at least a region of the second electrode current collector,
a separator between the first electrode plate and the second electrode plate,
a first electrode tab coupled to the first electrode current collector in a mandrel portion of the electrode assembly, and
a second electrode tab coupled to the second electrode current collector in a mandrel portion of the electrode assembly,
wherein a region of the first electrode current collector including the first electrode tab faces a wound first electrode plate, a region of the second electrode current collector including the second electrode tab faces a wound second electrode plate, and the second electrode active material layer is only on one surface of the second electrode current collector in a region preceding a first winding turn of the second electrode plate, and
wherein the first electrode tab is on a surface of the first electrode current collector that faces away from an interior of the electrode assembly, and the second electrode tab is on a surface of the second electrode current collector that faces away from the interior of the electrode assembly.

15. The secondary battery as claimed in claim 14, wherein, before the first winding turn of the first electrode plate, the first electrode active material layer is on one surface of the first electrode current collector.

16. The secondary battery as claimed in claim 14, wherein the first electrode active material layer and the second electrode active material layer face each other in a region between an extension line of the end of the first electrode plate and an extension line of the end of the second electrode plate in the mandrel portion.

17. The secondary battery as claimed in claim 14, wherein the separator is a single unit completely surrounding the end of the first electrode plate in the mandrel portion.

18. The electrode assembly as claimed in claim 1, wherein the region preceding the first winding turn of the second electrode plate that includes the second electrode active material layer only on one surface includes the second electrode active material layer and the second electrode tab on a same surface.

19. The electrode assembly as claimed in claim 1, wherein the first and second electrode tabs are on surfaces of respective first and second electrode current collectors that face opposite sides of the electrode assembly.

20. The electrode assembly as claimed in claim 1, further comprising a first insulating layer between the first electrode tab and an adjacent second electrode current collector, and a second insulating layer between the second electrode tab and an adjacent first electrode current collector.

* * * * *